UNITED STATES PATENT OFFICE.

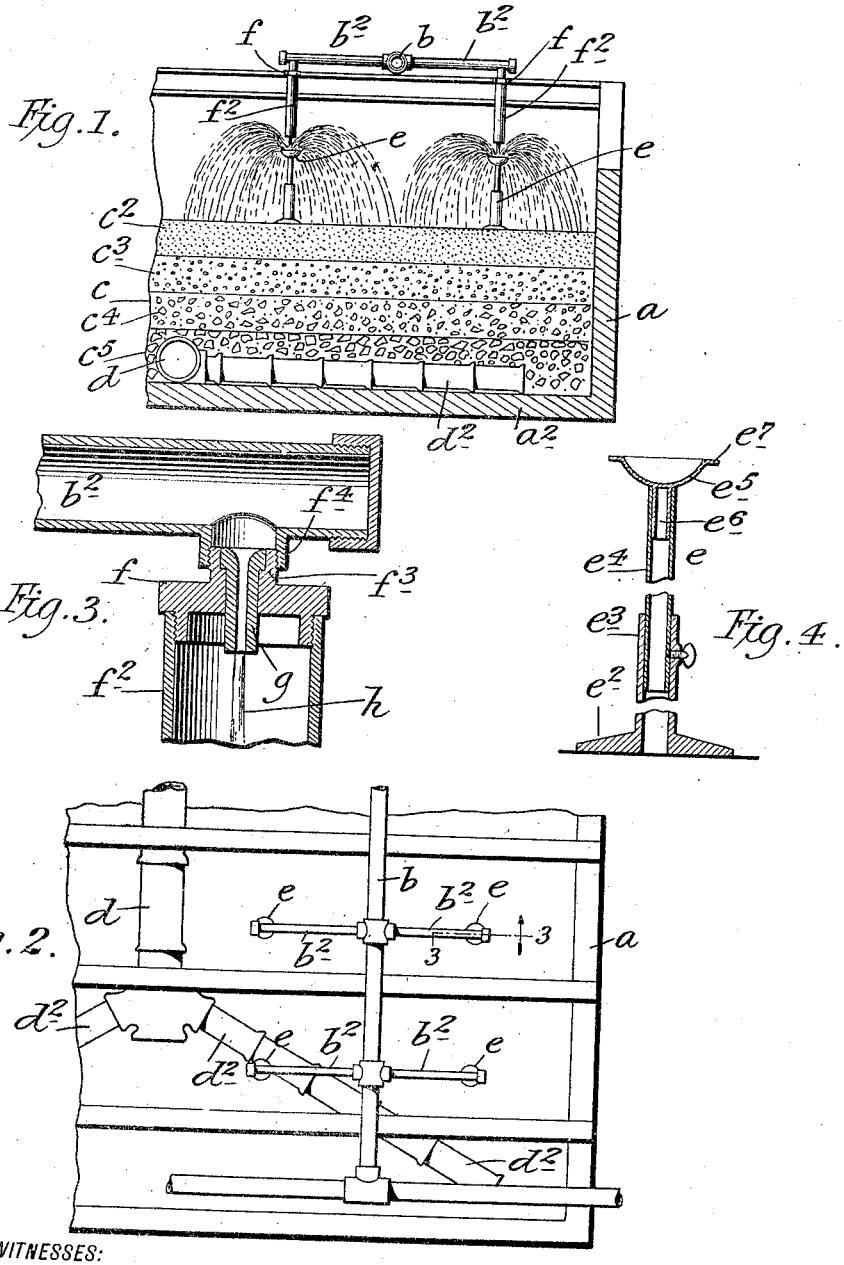

BOYD WILKIE, OF MOUNT VERNON, NEW YORK.

APPARATUS FOR FILTERING SEWAGE.

968,015.  Specification of Letters Patent.  Patented Aug. 23, 1910.

Application filed October 25, 1909. Serial No. 524,314.

*To all whom it may concern:*

Be it known that I, BOYD WILKIE, a citizen of the United States, and residing at Mount Vernon, in the county of Westchester and State of New York, have invented certain new and useful Improvements in Apparatus for Filtering Sewage, of which the following is a specification, such as will enable those skilled in the art to which it appertains to make and use the same.

It is customary in large cities and towns to first purify, to some extent, sewage water so as to prevent the pollution of rivers, lakes or bays into which the said sewage water is discharged, and it is also customary, in doing this, to take the sewage from the street sewers and to discharge it into receiving basins from which the sewage is discharged through a distributing gallery into a settling basin, from which the liquid or watery portion of the sewage is siphoned into distributing pipes from which it is discharged, into or upon filtering beds, or into a tank or tanks, or other suitable receivers, having filtering bed bottoms, and after filtering through these beds or bed bottoms the said liquid or the water resulting from said filtration is discharged by means of drain pipes into a river, lake, bay or other receiver in the usual way.

This invention relates particularly to the discharge of liquid sewage or sewage water from the distributing pipes into the filtering tanks or basins, or onto the filtering beds or bottoms of said tanks or basins, and the said invention relates more particularly to the use of splash cups or spraying devices of particular form and mounted on or supported above said filtering beds in such manner that the liquid sewage from the said pipes falls on said splash cups or spraying devices and is distributed equally and evenly over the entire surface of the filtering bed or beds so that the filtration of said liquid through said beds and the purification thereof during such filtration will be facilitated and properly performed so that the water which is discharged through the drain pipe or pipes will be in as nearly a pure condition as is possible under the circumstances, and the invention described and claimed herein consists of the means employed for discharging the liquid from the distributing pipes into the splash cups or spraying devices.

The invention is fully disclosed in the following specification of which the accompanying drawing forms a part, in which the separate parts of my improvement are designated by suitable reference characters in each of the views, and in which;—

Figure 1 is a transverse section of a part of a filtering tank employed in a sewage purification system and showing the method of discharging the liquid sewage thereinto and showing also my improvement. Fig. 2 a plan view of the construction shown in Fig. 1, Fig. 3 a section on the line 3—3 of Fig. 2 and on an enlarged scale; and, Fig. 4 a sectional view of a spraying device employed.

In a drawing forming part of this specification I have shown at $a$ a part of a filtering tank into which, in an apparatus for purifying sewage of the class referred to, the liquid sewage after leaving the settling basin or basins is discharged by the distributing pipe or pipes $b$. The bottom of this bed is composed of concrete, and placed thereupon is a filtering bed $c$ which consists of four layers $c^2$, $c^3$, $c^4$ and $c^5$ composed of broken stone, the bottom layer $c^5$ being composed of coarse broken stone, the next layer $c^4$ thereover of more finely divided stone, while the next layer $c^3$ consists of still more finely divided stone, and the top layer $c^2$ of very finely divided stone.

On the bottom $a^2$ of the filtering bed is placed, in the form of construction shown, a main drain pipe $d$ with which is connected branch drain pipes $d^2$, and the water after filtering through the filtering bed $c$ is collected by these drain pipes and carried off and discharged into an adjacent river, bay or other receiver in the usual manner.

In the construction shown the spraying devices $e$ consist of a support comprising a base $e^2$ having a tubular upright member $e^3$ in which is placed a vertical adjustable tubular support $e^4$ on the top of which is supported a splash cup $e^5$ having a stem $e^6$ adapted to enter the top part $e^4$ of the support. In practice these spraying devices are placed directly under the discharge points of the pipes $b$ or branch pipes $b^2$ connected therewith and from which the sewage or sewage water may be discharged and any desired number of the spraying devices $e$ may be employed, and said spraying devices may be adjustable so that the splash cups $e^5$ will be in a different horizontal plane, if desired, the object being to place these spraying devices and discharge the liquid sewage thereinto in such manner that the said liquid sewage will be distributed entirely over the surface of the filtering bed or beds so as to secure the greatest possible efficiency in the operation thereof. The splash cup or cup-shaped device $e^5$, any desired number of which may be employed, is provided with a rim $e^7$ which may be horizontal in cross section or concavo convex in cross section and this rim facilitates the even distribution of water or liquid sewage over the filtering bed or beds and experience determined that the operation of this splash cup or cups is much more effective when provided with the rim or flange $e^7$ than when no such rim or flange is employed.

In discharging the liquid sewage from the pipe or pipes $b$ and $b^2$ I connect with said pipe or pipes a coupling head $f$ to which is secured a guard or shield $f^2$ which is preferably tubular in form and which extends downwardly a predetermined distance. The coupling head $f$ is provided with a threaded tube neck $f^3$ which is screwed into a coupler $f^4$ connected with the pipe or pipes $b$ or $b^2$, and within said coupler head is placed a central nozzle or nozzle tube $g$ which extends downwardly into the guard or shield $f^2$ and through which the liquid sewage water is discharged, as shown at $h$. The object of the guard or shield is to prevent the wind from interfering with the vertical fall of the sewage water so that it will drop squarely in the splash cups $e^5$ which are placed centrally under the discharge tube or nozzle $g$ and it will be understood that one of these guards or shields $f^2$ is used in connection with each of the splash cups $e^5$ or with each of the spraying devices and my invention is not limited to the particular form or construction of the said guard or shield nor to the particular means employed for connecting it with the pipe or pipes $b$—$b^2$.

This invention has no bearing on the general construction of the sewage purification system herein shown and described but relates particularly to the distributing pipes $b$—$b^2$ and to the spraying devices $e$ provided with the splash cups $e^5$ and the means for discharging the sewage from said pipes into said splash cups.

Having fully described my invention what I claim as new, and desire to secure by Letters Patent is;—

1. An apparatus of the class described, said apparatus involving liquid distributing pipes and beds adapted to receive said liquids, and spraying devices supported on said beds and into which the liquids are discharged from said pipes.

2. An apparatus of the class described, said apparatus involving liquid distributing pipes and beds adapted to receive said liquids, and spraying devices supported on said beds and into which the liquids are discharged from said pipes, said spraying devices being vertically adjustable.

3. An apparatus of the class described, said apparatus involving liquid distributing pipes and beds adapted to receive said liquids, and spraying devices supported on said beds and into which the liquids are discharged from said pipes, said spraying devices consisting of vertically adjustable stands and saucer-shaped receivers detachably mounted thereon.

4. An apparatus of the class described, said apparatus involving liquid distributing pipes and beds adapted to receive said liquids, and spraying devices supported on said beds and into which the liquids are discharged from said pipes, said spraying devices consisting of vertically adjustable stands and saucer-shaped receivers detachably mounted thereon, said saucer-shaped receivers being provided at the top edge thereof with annular outwardly directed flanges.

5. An apparatus of the class described, said apparatus involving liquid distributing pipes and beds adapted to receive said liquids, and spraying devices supported on said beds and into which the liquids are discharged from said pipes, said pipes being provided with downwardly directed nozzles, and shields or guards inclosing said nozzles and extending downwardly therefrom.

6. An apparatus of the class described, said apparatus involving liquid distributing pipes and beds adapted to receive said liquids, and spraying devices supported on said beds and into which the liquids are discharged from said pipes, said spraying devices consisting of vertically adjustable stands and saucer-shaped receivers detachably mounted thereon, and said pipes being provided with downwardly directed nozzles, and shields inclosing said nozzles and extending downwardly therefrom.

In testimony that I claim the foregoing as my invention I have signed my name in presence of the subscribing witnesses this 22nd day of October 1909.

BOYD WILKIE.

Witnesses:
GEO. W. ELLIODT,
WILLIAM S. COFFEY